(12) United States Patent
Bhojan

(10) Patent No.: US 7,797,644 B1
(45) Date of Patent: Sep. 14, 2010

(54) METHOD AND SYSTEM FOR INPUTTING OPTIONAL VALUES INTO AN INPUT FIELD

(75) Inventor: Narendran Bhojan, Bangalore (IN)

(73) Assignee: Intuit Inc., Mountain View, CA (US)

( * ) Notice: Subject to any disclaimer, the term of this patent is extended or adjusted under 35 U.S.C. 154(b) by 441 days.

(21) Appl. No.: 11/869,642

(22) Filed: Oct. 9, 2007

(51) Int. Cl.
    *G06F 3/048* (2006.01)
(52) U.S. Cl. .................. 715/825; 715/827; 715/816; 715/817
(58) Field of Classification Search .......... 715/810–827
    See application file for complete search history.

(56) References Cited

U.S. PATENT DOCUMENTS

| | | | | |
|---|---|---|---|---|
| 5,086,513 | A * | 2/1992 | Lawrence et al. | 455/186.1 |
| 6,879,997 | B1 * | 4/2005 | Ketola et al. | 709/208 |
| 7,500,201 | B2 * | 3/2009 | Treibach-Heck et al. | 715/780 |
| 7,587,385 | B2 * | 9/2009 | Vayssiere | 1/1 |
| 2002/0070924 | A1 * | 6/2002 | Petersen | 345/172 |
| 2002/0072955 | A1 * | 6/2002 | Brock | 705/10 |
| 2003/0038825 | A1 * | 2/2003 | Wen et al. | 345/700 |
| 2003/0132961 | A1 * | 7/2003 | Aarts et al. | 345/760 |
| 2003/0172343 | A1 * | 9/2003 | Leymaster et al. | 715/500 |
| 2003/0208472 | A1 * | 11/2003 | Pham | 707/2 |
| 2003/0208534 | A1 * | 11/2003 | Carmichael | 709/203 |
| 2006/0048074 | A1 * | 3/2006 | Klein | 715/811 |
| 2006/0161889 | A1 * | 7/2006 | Stabb et al. | 717/113 |
| 2006/0184828 | A1 * | 8/2006 | Wynn et al. | 714/38 |
| 2007/0112798 | A1 * | 5/2007 | Polk et al. | 707/100 |
| 2007/0124500 | A1 * | 5/2007 | Bedingfield et al. | 709/245 |

* cited by examiner

*Primary Examiner*—Tadeese Hailu
(74) *Attorney, Agent, or Firm*—Osha•Liang LLP

(57) ABSTRACT

A method for inputting optional values into an input field that includes receiving an event to trigger input into the input field, identifying a first optional value and a second optional value associated with the input field, and dynamically assigning, in response to the event, a first unique hotkey to the first optional value and a second unique hotkey to the second optional value. The method may also include displaying the first optional value with the first unique hotkey and the second optional value with the second unique hotkey, receiving input of the first unique hotkey, and populating the input field with the first optional value based on the input of the first unique hotkey.

12 Claims, 6 Drawing Sheets

METHOD AND SYSTEM FOR INPUTTING OPTIONAL VALUES INTO AN INPUT FIELD

BACKGROUND

User interfaces provide a mechanism by which a user communicates with a program on a computer system. A common goal when designing a user interface is to provide a mechanism for simple and efficient communication. Specifically, the amount of time to provide instructions and receive information based on those instructions should be minimal and at the same time easy to learn and simple to use. One mechanism by which a user may submit commands is hotkeys. A hotkey is a key or key combination that is assigned to a function. For example, a user of a word processing application may press the <Ctrl> key and the <S> key on the keyboard to trigger the save function. In another example, a user may press the <Alt> key and the <F> key to open the file menu, followed by the <S> key to trigger the save function.

Hotkeys are generally statically assigned to functions. Specifically, the application maintains a list of hotkeys with an identifier of the function. A user may update the list of hotkeys by opening a dialog box, selecting a function, and specifying a hotkey. The user-assigned hotkeys may then be used the next time the user uses the application. Specifically, after the user updates the list of hotkeys, the user may use the hotkey to request the corresponding function.

SUMMARY

In general, in one aspect, the invention relates to a method for inputting optional values into an input field that includes receiving an event to trigger input into the input field, identifying a first optional value and a second optional value associated with the input field, and dynamically assigning, in response to the event, a first unique hotkey to the first optional value and a second unique hotkey to the second optional value. The method may also include displaying the first optional value with the first unique hotkey and the second optional value with the second unique hotkey, receiving input of the first unique hotkey, and populating the input field with the first optional value based on the input of the first unique hotkey.

In general, in one aspect, the invention relates to a method for inputting optional values into an input field that includes receiving an event to trigger input into the input field, identifying a first optional value, a second optional value, and a third optional value associated with the input field, and dynamically assigning, in response to the event, a first unique hotkey to the first optional value, a second unique hotkey to the second optional value, and a third unique hotkey to the third optional value. The method may also include displaying the first optional value with the first unique hotkey, the second optional value with the second unique hotkey, and the third optional value with the third unique hotkey, and receiving a character into the input field. The method may further include generating a filtered list using the character, wherein the filtered list comprises the second optional value and the third optional value and wherein the first optional value is associated with the filtered list. Additionally, the method may include assigning, in response to the event, the first unique hotkey to the second optional value and the second unique hotkey to the third optional value, displaying the second optional value with the first unique hotkey and the third optional value with the second unique hotkey, receiving the second hotkey as input, and populating the input field with the third optional value based upon receipt of the second hot key.

In general, in one aspect, the invention relates to a method for selecting an optional value from a plurality of optional values that includes selecting an input field, viewing a dynamically generated list for the input field comprising the plurality of optional values, wherein each optional value in the dynamically generated list is assigned a unique hotkey after the input field is selected, selecting the optional value using the unique hotkey assigned to the optional value, and populating the input field with the optional value based on the input of the unique hotkey assigned to the optional value.

In general, in one aspect, the invention relates to a system for inputting optional values into an input field that includes a first optional value and a second optional value, and a user interface module configured to receive an event to trigger input into the input field, identify the first optional value and the second optional value associated with the input field, and dynamically assign, in response to the event, a first unique hotkey to the first optional value and a second unique hotkey to the second optional value. The user interface module may further be configured to display the first optional value with the first unique hotkey and the second optional value with the second unique hotkey, receive input of the first unique hotkey, and populate the input field with the first optional value based on the input of the first unique hotkey.

In general, in one aspect, the invention relates to a computer usable medium that includes computer readable program code embodied therein for causing a computer system to receive an event to trigger input into an input field, identify a first optional value, a second optional value, and a third optional value associated with the input field, and dynamically assign, in response to the event, a first unique hotkey to the first optional value, a second unique hotkey to the second optional value, and a third unique hotkey to the third optional value. The computer readable program code may further cause the computer to display the first optional value with the first unique hotkey, displaying the second optional value with the second unique hotkey, and displaying the third optional value with the third unique hotkey. Additionally, the computer readable program code may cause the computer to receive a character into the input field, generating a filtered list using the character, wherein the filtered list comprises the second optional value and the third optional value and wherein the first optional value is associated with the filtered list. The computer readable program code may further cause the computer to assign, in response to the event, the first unique hotkey to the second optional value and the second unique hotkey to the third optional value, display the second optional value with the first unique hotkey and the third optional value with the second unique hotkey, receive the second hotkey as input, and populate the input field with the third optional value based upon receipt of the second hot key.

Other aspects of the invention will be apparent from the following description and the appended claims.

DETAILED DESCRIPTION

Figure 1:
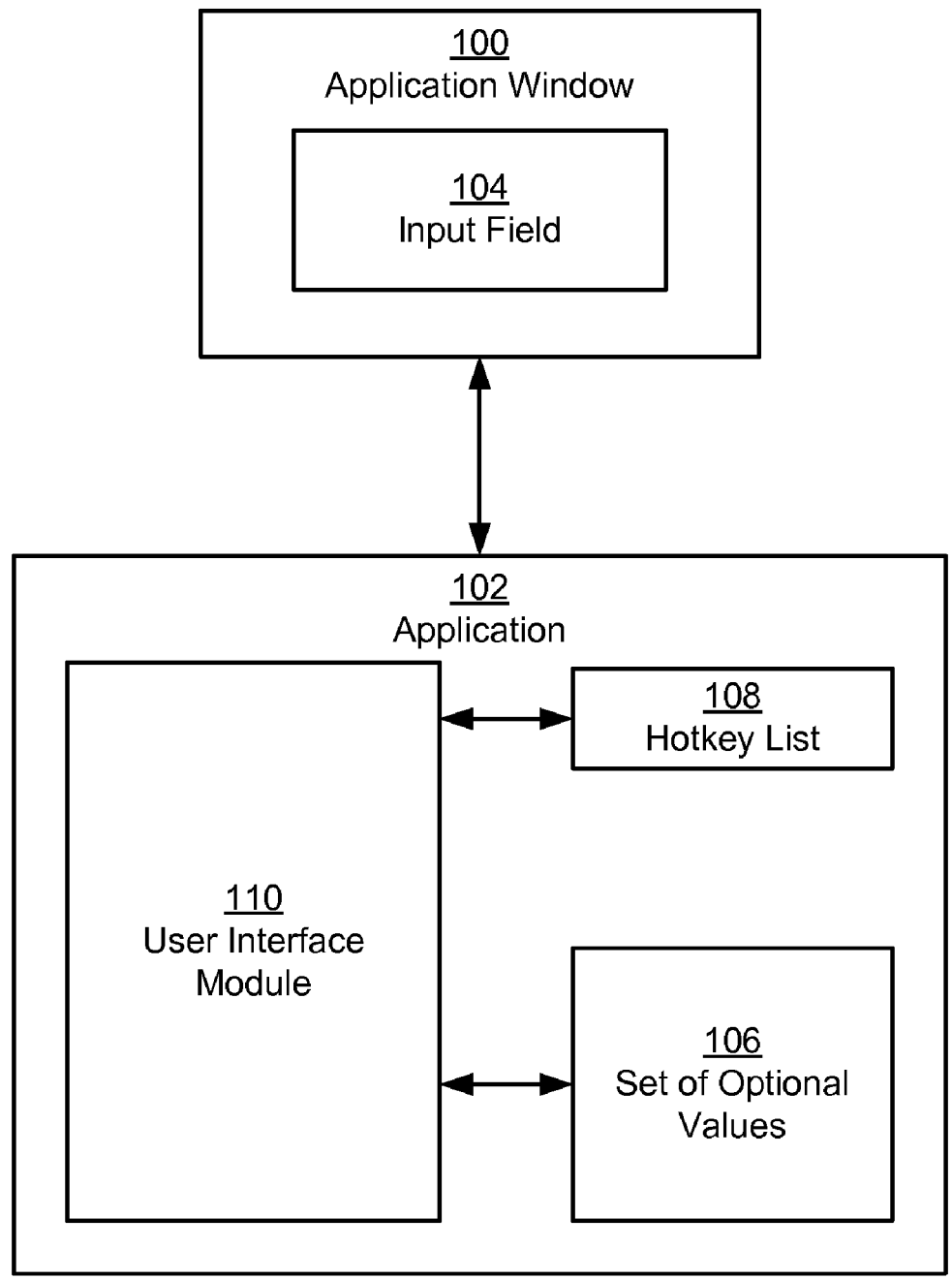
FIG. 1 shows a schematic diagram of a system for selecting an optional value in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for selecting an optional value from a list of optional values. Specifically, embodiments of the invention provide a method and system for assigning hotkeys to the optional values at runtime.

FIG. 1 shows a schematic diagram of a system for selecting an optional value in accordance with one or more embodiments of the invention. As shown in FIG. 1, the system includes an application window (100) and an application (102) in accordance with one or more embodiments of the invention. Each of these components is described below.

In accordance with one or more embodiments of the invention, an application window (100) is a portion of an application (102) (described below) that is viewable by a user. In one or more embodiments of the invention, at least one input field (104) is displayed in the application window (100). An input field (104) is an area in the application window (100) in which a user may submit input for processing by the application (102). For example, the input field (104) may be a text field, a cell, a collection of radio buttons, a collection of checkboxes, a collection of menu items, a list box, a combo box, a collection of push buttons, etc. The application window (100) may be controlled, at least in part, by an application (102).

In one or more embodiments of the invention, the application (102) is a software program capable of interacting with a user. For example, the application (102) may be a word processor, a web browser, a spreadsheet application, a web browser, or any other program. The application (102) may include a set of optional values (106), a hotkey list (108), and a user interface module (110).

In one or more embodiments of the invention, the set of optional values (106) includes optional values (not shown) that may be selected by the user for input into the input field (104). The optional value may be user-generated data, data from the application, or any other type of data that may be input into the input field (104). User-generated data is data that a user previous submitted into the same or different input field(s). For example, an optional value may be a web address or a value in a cell of a spreadsheet application, which was previously submitted by a user. In another example, an optional value may be data created by the application that may be later filtered according to input from a user into another, related input field. The set of optional values (106) may be used to dynamically generate a list of optional values (not shown).

A dynamically generated list is a list of optional values that is generated based on a request from the set of optional values (106). For example, the dynamically generated list may require dynamic generation because the set of optional values changes (e.g., additional optional values added by submissions into the input field, optional values deleted, etc.) and/or because identification of the filter used to apply to the dynamically generated list occurs at runtime. Thus, a static list is not possible.

Continuing with FIG. 1, the application (102) also includes a hotkey list (108) in accordance with one or more embodiments of the invention. The hotkey list (108) is a collection of hotkeys (not shown) (described below). The hotkey list (108) may be a list of hotkeys that are available to be assigned to optional values in the set of optional values (106). Alternatively, the hotkey list (108) may be a list of hotkeys that are currently assigned.

The hotkey is a single keystroke, a combination of keystrokes, or a series of keystrokes on a keyboard or keypad. For example, the hotkey may be at least one function key (e.g., <Ctrl> key, <Alt> key, <Shift> key, etc.) with one or more additional keys (e.g., alphanumeric key or symbol key) in accordance with one or more embodiments of the invention. Further, in one or more embodiments of the invention, the hotkey is specifically and uniquely assigned to an optional value. In particular, each optional value in the dynamically generated list is assigned to a unique hotkey that is different from other optional values in accordance with one or more embodiments of the invention.

The assignment of the unique hotkey is specific because the assignment occurs before the user interface module (described below) receives input from the user that directly results in the selection of the optional value in accordance with one or more embodiments of the invention. In general, the use of a hotkey requires fewer keystrokes on a keyboard or keypad than requiring the user to submit the data directly.

For example, consider the scenario in which a list generated from the set of optional values has twenty optional values. Further, the first five characters of each optional value is the same. The hotkeys that are assigned to the optional value are each a combination of the <Ctrl> key and a one or two digit number. Accordingly, to select the sixth item in the list using a keyboard, the user may press the <Ctrl> key and the <6> key in combination, rather than the at least five keystrokes that would otherwise have to be pressed.

In another example, consider the scenario in which the first ten characters of the first fifteen optional values are the same. Further, in the example, the hotkeys that are assigned to the optional value are each a combination of the <Ctrl> key and a consecutive integer. If the user wants to select the thirteenth optional value in the list, the user may type the first eleven characters of the desired optional value, press the down arrow key thirteen times, or use the hotkey by pressing the <Ctrl> key and the <1> key followed by the <3> key.

Continuing with FIG. 1, the user interface module (110) is connected to the set of optional values (106) and the hotkey list (108) in accordance with one or more embodiments of the invention. The user interface module (110) includes functionality to communicate with a user by receiving and interpreting instructions from a user and displaying output in the application window (100). Specifically, the user interface module (110) includes functionality to add new optional values to the set of optional values (106), assign hotkeys to optional values, display the hotkeys and optional values in the application window (100), and receive and interpret the selection of one or more hotkeys.

While FIG. 1 shows the set of optional values (106), the hotkey list (108) and the user interface module (110) as part of the application (102), one or all of the aforementioned components, or part of the functionality provided by the aforementioned components may be separate from the application (102). For example, the user interface module (110) may be a plug-in to the application (102). In another example, any of the components may be part of the operating system of the computer system upon which the application (102) executes. In another example, the components may be shared by multiple applications. For example, the set of optional values (106) and/or hotkey list (108) may be maintained separately from the applications.

Figure 2:
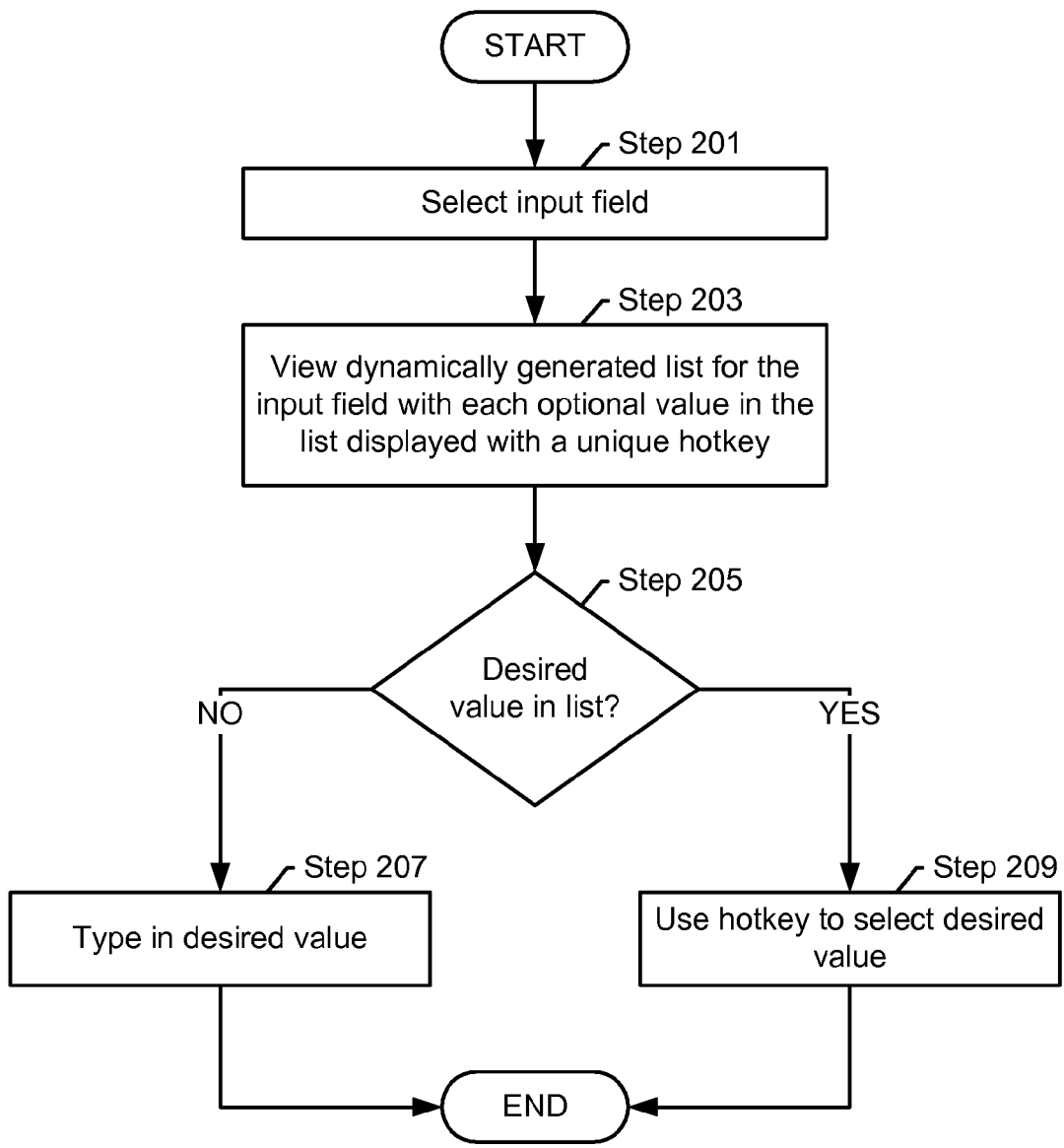
FIGS. 2-3 show flowcharts for selecting an optional value in accordance with one or more embodiments of the invention.
Figure 3:
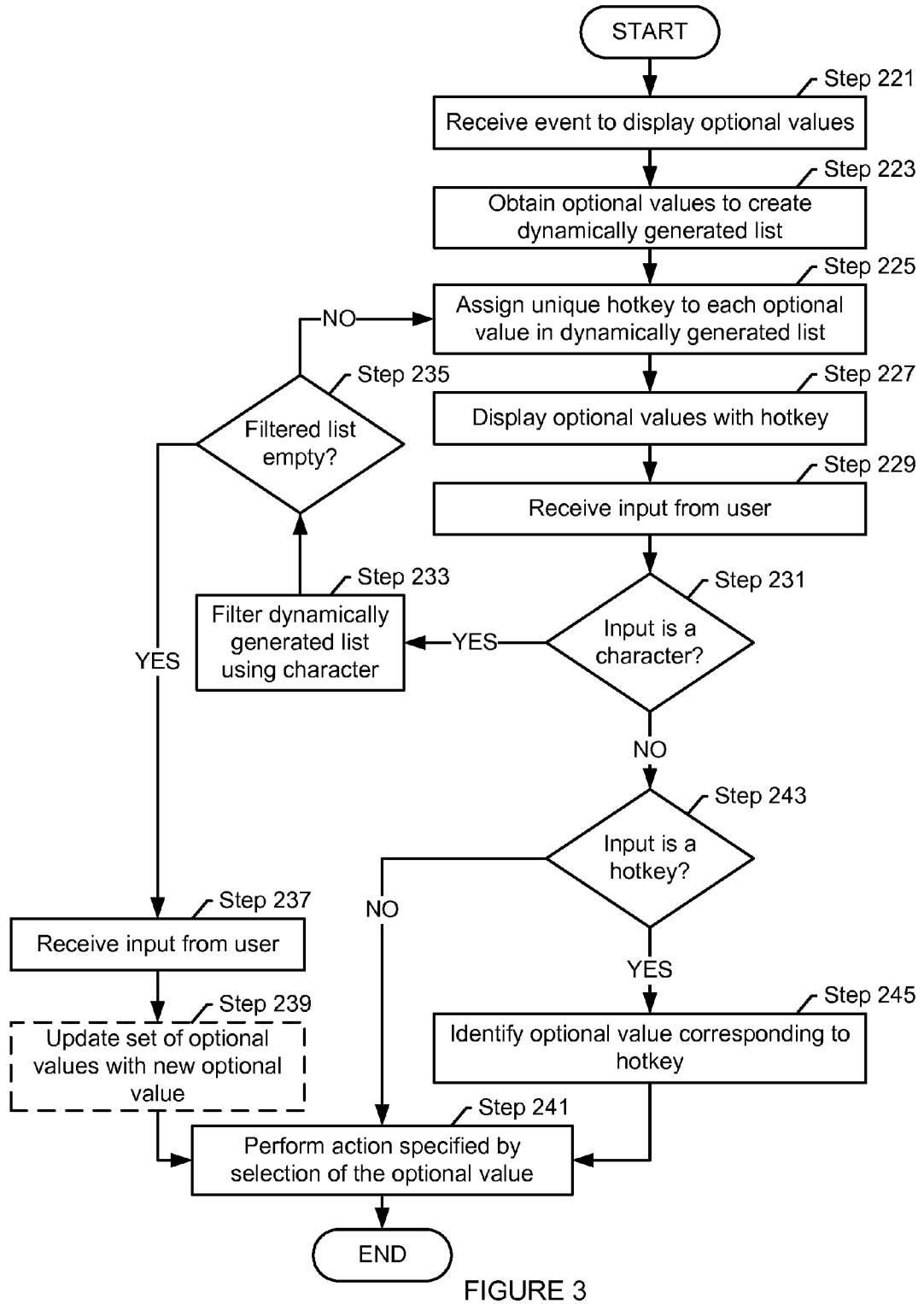

FIGS. 2-3 show flowcharts for selecting an optional value in accordance with one or more embodiments of the invention. While the various steps in these flowcharts are presented and described sequentially, one of ordinary skill will appreciate that some or all of the steps may be executed in different orders and some or all of the steps may be executed in parallel.

FIG. 2 shows a flowchart for a user to select an optional value in accordance with one or more embodiments of the invention. Initially, the user initiates an event to display optional values in the input field (Step 201). The user may use a variety of mechanisms to initiate the event. For example, the user may open an application that has the input field. When the application is opened, an application window having the input field may be displayed. The display of the input field in the application window may be the event in accordance with one or more embodiments of the invention.

Alternatively, the application window may automatically select the input field by showing the input field highlighted or with a cursor to show that the input field is ready for data entry. Alternatively or in addition to, the user may select the input field by using mechanisms known in the art, such as mouse, tab key, arrow keys, etc. The event may also be submission of initial input by the user, such as a character, into the input field or into a separate input field. For example, the event may be submission by the user of the first letter of the optional value.

After the event to display optional values in the input field, the user views a dynamically generated list for the input field. Each optional value in the list is displayed with a unique hotkey in accordance with one or more embodiments of the invention (Step 203). The dynamically generated list may be displayed as a list with or without a scrollbar, a list of check boxes or radio buttons, or any other list known in the art. In one or more embodiments of the invention, each hotkey is displayed directly next to the corresponding optional value.

For example, consider the scenario in which the application allows a user to call a phone number obtained from a business telephone directory. The phone number that the user calls may be the specific phone number for the department of the business the user wants to contact. However, the list of departments that are a part of the business are dependant on the business. For example, an airline does not have a men's clothing department while a department store does not have a department for frequent flyers. Thus, the display of the men's department or the frequent flyers department is dependent upon whether the business is a department store or an airline. Accordingly, in such instances the user interface may have two input fields. The first input field may allow the user to select a name of the business. The selection of the name of the business may be the event in the example. After selection of the name of the business, a second input field may be created. The second input field may be a dynamically generated list of radio buttons next to department names with the hotkeys. Thus, in the example, the input field with the department names is generated and viewable to the user only after the user selects a business.

Continuing with FIG. 2, the user determines whether the desired optional value is in the list in accordance with one or more embodiments of the invention (Step 205). If the desired optional value is not in the list, then in one or more embodiments of the invention, the user presses (or otherwise manually enters) the desired optional value (Step 207). Those skilled in the art will appreciate that ability to press in the desired optional value may be dependent on the type of input field (e.g., text box or checkbox).

Alternatively, if the user sees the desired optional value, then the user may use the hotkey to select the desired optional value (Step 209). Thus, the user interface module interprets the hotkey as the user's desired optional value. The action that the user expects by the selection may be performed.

FIG. 3 shows a flowchart of a method to select an optional value from the perspective of the user interface module in accordance with one or more embodiments of the invention. Initially, an event is received to display optional values (Step 221). The event may be, for example, any of the events described above.

Once the event is received, optional values from the set of optional values are obtained to create a dynamically generated list (Step 223). In accordance with one or more embodiments of the invention, the optional values may be obtained by calculating the optional values, sending a query to a database, accessing a history file, or performing any other method known in the art. Further, the optional values may be pre-filtered. For example, if the event is receipt of the first few letters of the desired optional value, the optional values may be pre-filtered to remove any optional value that does not have the requisite first letters. Additionally, the optional values may be sorted as required by the application. For example, the optional values may be sorted alphabetically or according to historical selections of the optional values (e.g., the most recently used optional value is displayed at the top of the list and the least recently used optional value is displayed at the bottom of the list).

Each optional value in the dynamically generated list is assigned a unique hotkey (Step 225). Assigning the optional value to the unique hotkey may be performed by numbering the optional value, such as by giving each optional value a number corresponding to the position in the dynamically generated list. Alternatively, the optional values may be assigned unique hotkeys by identifying from the hotkey list which hotkeys are available. One skilled in the art will appreciate that other mechanisms may also be used to selectively assign unique hotkeys to optional values.

Once the unique hotkeys are assigned, the user interface module may keep track of which hotkeys correspond to which optional values. For example, the user interface module may maintain a data structure, such as a list or a table, that associates the hotkeys to the optional values. The data structure may be deleted when the application closes or the optional values are no longer displayed, such as by the selection of a different input box. Alternatively, the data structure may persist after the application closes and be available the next time the application is used.

Continuing with the discussion of FIG. 3, the optional values with the unique hotkeys are displayed in accordance with one or more embodiments of the invention (Step 227). When the optional values are displayed, the user may view the optional values and the hotkeys and determine what action to perform. Subsequently, input is received from the user (Step 229).

The user interface module determines whether the input is a character (Step 231). If the input is a character, then the dynamically generated list of optional values may be reduced according to the input. In such cases, the dynamically generated list is filtered using the character in accordance with one or more embodiments of the invention (Step 233). Rather than filtering the dynamically generated list obtained in Step 223, a new dynamically generated list may be generated using the character in addition to previously applied filters on the set of optional values.

A determination may be made whether the resulting filtered list (or newly generated dynamically generated list) is empty (Step 235). If the resulting filtered list (or newly generated dynamically generated list) is not empty, then the optional values in the filtered list (or newly generated dynamically generated list) may each be reassigned (or assigned) a unique hotkey in accordance with one or more embodiments of the invention (Step 225). One skilled in the art will appreciate that reassigning hotkeys is optional. (However, if a new dynamically generated list is generated, then hotkeys must be assigned). In an alternative, the remaining optional values after the filtering may maintain the hotkeys that they were previously assigned.

In Step 235, if the filtered list (or newly generated dynamically generated list) is empty, then no optional value exists that conforms to the input from the user. The user interface module may wait to receive additional input from the user (Step 237). The additional input may be the selection of a new optional value in accordance with one or more embodiments of the invention. For example, the user may enter additional characters of the new optional value and/or indicate the submission of a new optional value (e.g., selection of submit button on the application window, typing of the <enter> key, etc.).

In step 239, the set of optional values may be updated with the new optional value in accordance with one or more embodiments of the invention. Specifically, the user interface module may add the optional value to the set of optional values such that the optional value is available to the user upon the next event to display the optional values.

In Step 241, regardless of whether the hotkey was enter or the new optional value was manually entered, the action specified by the selection (or entry) of the optional value is performed (Step 241). The action specified by the selection (or entry) of the optional value is dependent on the application. For example, the optional value may appear as selected in the input box. In another example, if the optional value is a web address and the application is a web browser, then the web browser may navigate to the web address.

Continuing with FIG. 3, if the input is not a character in Step 231, then the user interface determines whether the input is a hotkey in accordance with one or more embodiments of the invention (Step 243). If the input is a hotkey, then the user interface module identifies the optional value corresponding to the hotkey (Step 245). The user interface module may identify the optional value, for example, by consulting the data structure (as discussed above). Once the optional value is identified, the user interface module performs the action specified by the selection of the optional value (Step 241).

Alternatively, if the input is not a hotkey, then the input may be a selection of an optional value (e.g., by a selection of a <submit> button or by typing an enter key), a request to navigate away from the input field, or any other request. In such scenarios, the action specified by the optional value in the input field is performed if the action is requested (Step 241).

Figure 4A:
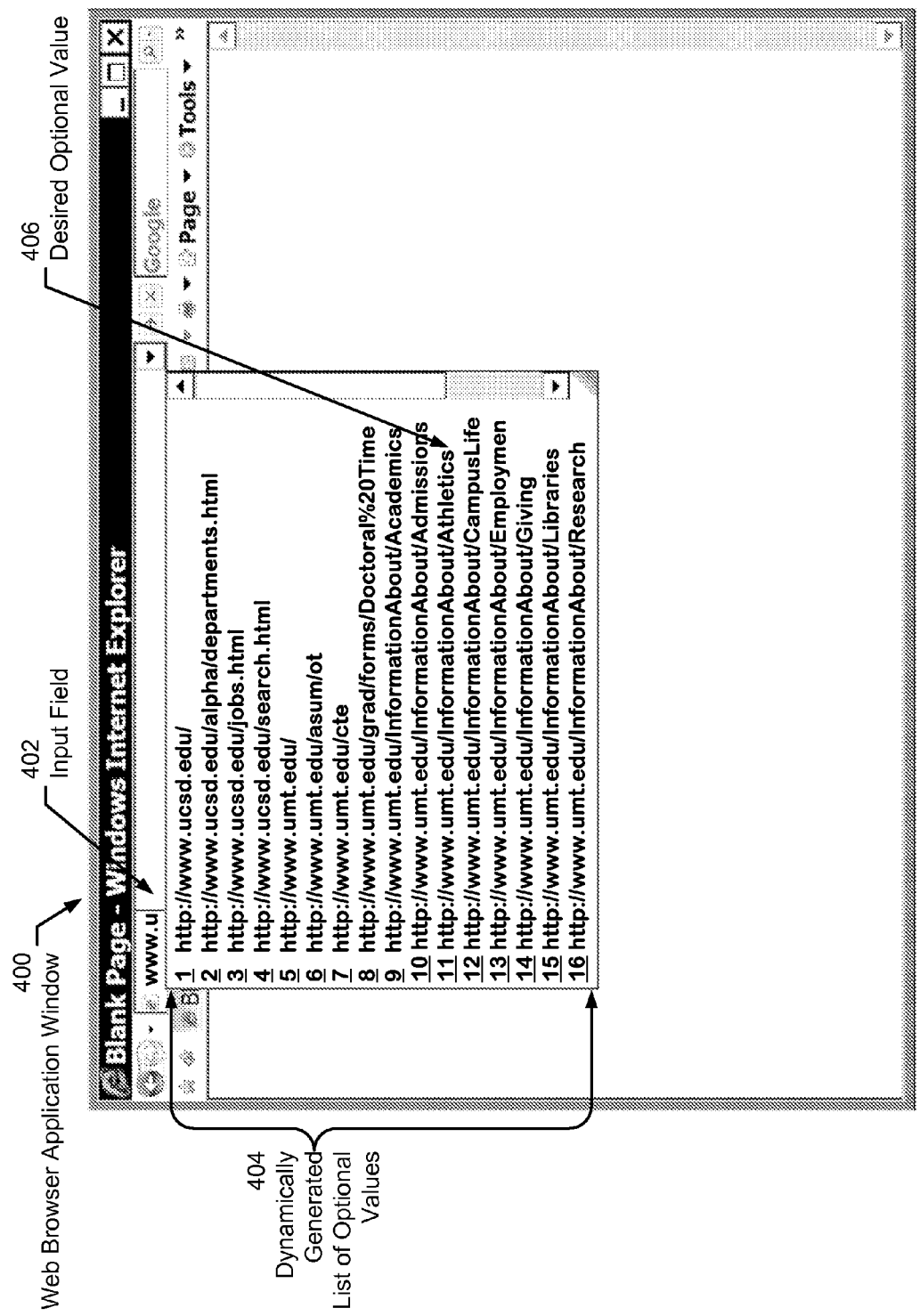
FIGS. 4A-4B show example user interfaces for selecting an optional value in accordance with one or more embodiments of the invention.
Figure 4B:
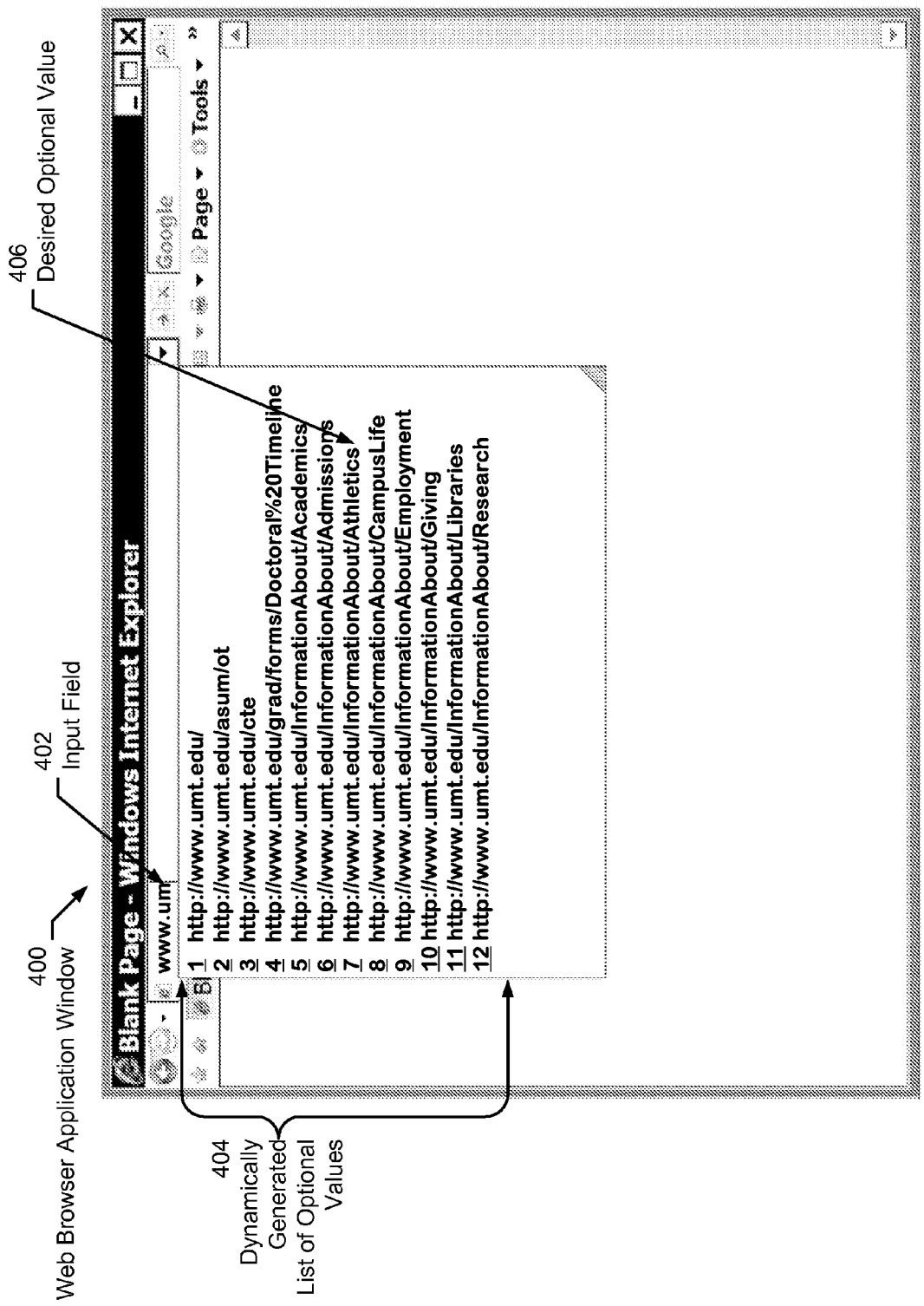

FIGS. 4A-4B show example user interfaces for selecting an optional value in accordance with one or more embodiments of the invention. The example shown in FIGS. 4A-4B is merely exemplary and should not be construed as limiting the invention. For the following example, consider the scenario in which a user wants to view a previously visited website that gives information about athletics at the University of Montana. Accordingly, in the example, the user may open a web browser application, such as Windows® Internet Explorer® web browser (Windows® and Internet Explorer® are registered trademarks of Microsoft Corporation, located in Redmond, Wash., USA).

FIG. 4A shows an example web browser application window (400) in accordance with one or more embodiments of the invention. When the user views the web browser application window (400), the input field for the web address (402) may be selected. Therefore, the user may begin typing the website of the University of Montana by typing initial characters of "www.u" (as shown in the input field (402)). In response to the initial characters, the user interface module (not shown) of the web browser may obtain optional values corresponding to web pages that the user has navigated to in the past by accessing a history file (not shown). The user interface module may filter the optional values to show only those that begin with "www.u". Additionally, the user interface module may then assign each optional value a numeric hotkey. Thus, a dynamically generated list of optional values (404) may be displayed with the unique hotkey.

As shown in the example of FIG. 4A, the dynamically generated list may include multiple web addresses, such as web addresses for both the University of California, San Diego, and for the University of Montana. While viewing the dynamically generated list, the user may see the web address for information about athletics at the University of Montana as the eleventh optional value in the list. Thus, the eleventh optional value is the desired optional value (406).

The user may also see that the desired optional value (406) has eleven for a hotkey and know that the selection of the hotkey requires typing the <Alt> key.

Accordingly, in the example, the user may press the <Alt> key while typing <1> twice. The user interface module may differentiate between typing the <Alt> key while typing <1> once with typing the <Alt> key while typing <1> twice by waiting a predetermined amount of time to determine whether a second digit will be pressed and/or by determining whether the <Alt> key is released. Once the hotkey is selected, the input field is populated with the web address and the web browser navigates to the website that gives information about athletics at the University of Montana.

Alternatively, rather than using a hotkey, the user may continue typing an additional character of the web address for the website desired by the user after the dynamically generated list is displayed. FIG. 4B shows an example web browser application window (400) after the user inputs an "m" in the input field (402) of FIG. 4A in accordance with one or more embodiments of the invention.

As shown in the example FIG. 4B, the input field now has the value "www.um". Accordingly, the dynamically generated list of optional values (404) in FIG. 4A may be filtered to remove any optional value that does not have an "m" as the sixth character. The result of the additional filtering is shown in the dynamically generated list of optional values (404) in FIG. 4B. As shown in FIG. 4B, the list from FIG. 4A is reduced to only twelve optional values in FIG. 4B.

Additionally, in accordance with one or more embodiments of the invention, hotkeys are reassigned to optional values in the dynamically generated list of optional values (404) in FIG. 4B. Thus, while the desired optional value (406) previously had a hotkey of eleven, the desired optional value has a hotkey of seven. Thus, the user may now press the <Alt> key and the <7> key in combination to select the desired optional value. As a result of the selection, the input field (402) is populated with the desired optional value. Further, the web browser navigates to the website that gives information about athletics at the University of Montana. Thus, even though the list of historically visited websites can only be generated dynamically, the user may use hotkeys to select optional values from the list.

Figure 5:
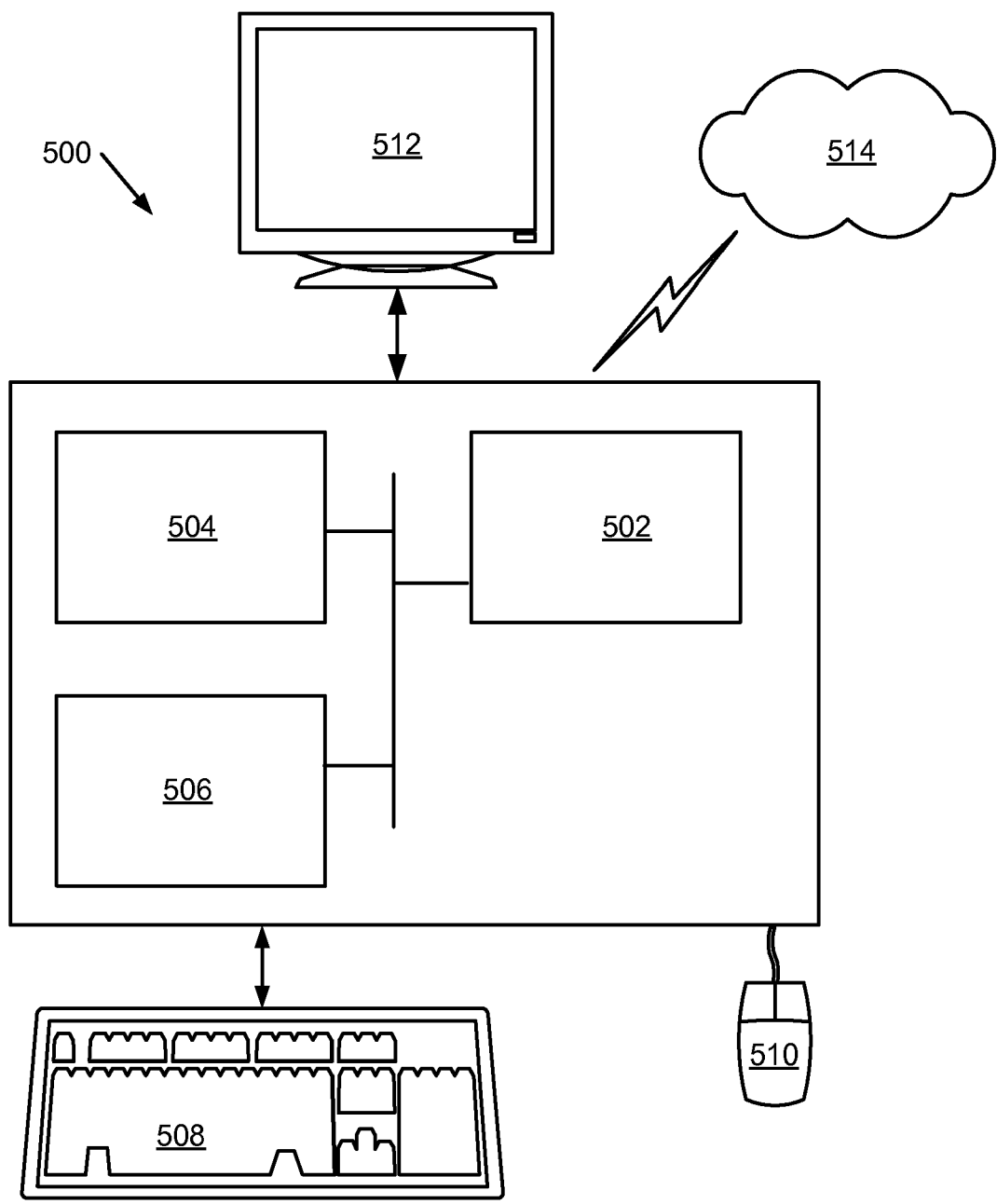
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (514) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., application, display, input device, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for inputting optional values into an input field comprising:
   receiving, by a processor, a string input for the input field;
   identifying, by the processor, an optional value based on the string input;
   dynamically assigning, by the processor and in response to the string input, a hotkey comprising a number to the optional value;
   displaying, on a display device, a list comprising the optional value with the number at a first position within the list;
   receiving, by the processor and after displaying the list, input of the hotkey;
   storing, by the processor and after receiving input of the hotkey, the optional value with the hotkey in a repository;
   populating, by the processor, the input field with the optional value based on the input of the hotkey;
   receiving, by the processor and after storing the optional value with the hotkey in the repository, a new string input for the input field, wherein the string input and the new string input are different;
   retrieving, by the processor and based on the new string input, the optional value with the hotkey from the repository; and
   displaying, on the display device, a new list comprising the optional value with the number at a second position within the new list, wherein the first position and the second position are different.

2. The method of claim 1, further comprising:
   performing an action based on the optional value.

3. The method of claim 1, wherein the input field is at least one selected from a group consisting of a text field, a cell, and a collection of radio buttons, and a collection of checkboxes, a collection of menu items, a list box, a combo box, a collection of push buttons.

4. The method of claim 1, wherein the optional value is user-generated.

5. The method of claim 1, wherein the optional value is historical.

6. A system for inputting optional values into an input field comprising:
   a processor;
   a display device operatively connected to the processor; and
   a memory operatively connected to the processor, wherein the memory comprises program instructions executable by the processor to:
   receive a string input for the input field;
   identify an optional value based on the string input;
   dynamically assign, in response to the string input, a hotkey comprising a number to the optional value;
   display, on the display device, a list comprising the optional value with the number at a first position within the list;
   receive, after displaying the list, input of the hotkey;
   store, after receiving input of the hotkey, the optional value with the hotkey in a repository;
   populate the input field with the optional value based on the input of the hotkey;
   receive, using the processor and after storing the optional value with the hotkey in the repository, a new string input for the input field, wherein the string input and the new string input are different;
   retrieve, using the processor and based on the new string input, the optional value with the hotkey from the repository; and
   display, on the display device, a new list comprising the optional value with the number at a second position within the new list, wherein the first position and the second position are different.

7. The system of claim 6, wherein the input field is at least one selected from a group consisting of a text field, a cell, and a collection of radio buttons, and a collection of checkboxes, a collection of menu items, a list box, a combo box, a collection of push buttons.

8. The system of claim 6, wherein the optional value is user-generated.

9. A computer-readable medium storing a plurality of instructions for inputting optional values into an input field, the plurality of instructions comprising functionality to:
   receive a string input for the input field;
   identify an optional value based on the string input;
   dynamically assign, in response to the string input, a hotkey comprising a number to the optional value;
   display, on a display device, a list comprising the optional value with the number at a first position within the list;
   receive, after displaying the list, input of the hotkey;
   store, using the processor and after receiving input of the hotkey, the optional value with the hotkey in a repository;
   populate the input field with the optional value based upon input of the hotkey;

receive, after storing the optional value with the hotkey in the repository, a new string input for the input field, wherein the string input and the new string input are different;

retrieve, based on the new string input, the optional value with the hotkey from the repository; and display, on the display device, a new list comprising the optional value with the number at a second position within the new list, wherein the first position and the second position are different.

10. The computer readable medium of claim 9, wherein the input field is at least one selected from a group consisting of a text field, a cell, and a collection of radio buttons, and a collection of checkboxes, a collection of menu items, a list box, a combo box, a collection of push buttons.

11. The computer readable medium of claim 9, wherein the optional value is user-generated.

12. The computer readable medium of claim 9, wherein the optional value is historical.

* * * * *